United States Patent [19]

Cove et al.

[11] 4,360,040

[45] Nov. 23, 1982

[54] MULTIPLE ORIFICE VALVES

[75] Inventors: Harry R. Cove, Huntington Beach; John D. Muchow, Long Beach, both of Calif.

[73] Assignee: Smith International Inc., Newport Beach, Calif.

[21] Appl. No.: 125,273

[22] Filed: Feb. 27, 1980

[51] Int. Cl.³ .............................................. F16K 47/04
[52] U.S. Cl. ................................. 137/625.3; 251/208; 138/43; 137/625.31
[58] Field of Search ........... 137/625.31, 625.3, 625.12, 137/DIG. 6; 251/206, 208; 138/43

[56] References Cited

U.S. PATENT DOCUMENTS

| | | | |
|---|---|---|---|
| 610,723 | 9/1898 | Riggin | 137/625.31 |
| 2,765,809 | 10/1956 | Lamar | 137/625.12 |
| 3,207,181 | 9/1965 | Willis | 137/625.31 |
| 3,331,396 | 7/1967 | Willis | 137/625.31 |
| 4,154,263 | 5/1979 | Cary | 137/625.3 |

FOREIGN PATENT DOCUMENTS

| | | | |
|---|---|---|---|
| 564628 | 11/1932 | Fed. Rep. of Germany ... | 137/625.3 |
| 48586 | 6/1919 | Sweden ........................... | 137/625.31 |
| 148190 | 12/1954 | Sweden . | |

*Primary Examiner*—Arnold Rosenthal
*Attorney, Agent, or Firm*—Christie, Parker & Hale

[57] ABSTRACT

An orifice flow control valve is provided with a set of disks mounted in the body of the valve. A downstream disk is mounted in a fixed position in the valve body and an upstream disk is rotatable in the valve body and in face-to-face engagement concentric with the downstream disk. There are holes in the downstream disk and in the upstream disk for control of the amount and direction of flow of fluids through the valve. When the valve is in a position between fully open and closed, there are at least two streams through the disks which impinge on each other for providing a resultant stream flowing generally parallel to the axis of the valve.

27 Claims, 7 Drawing Figures

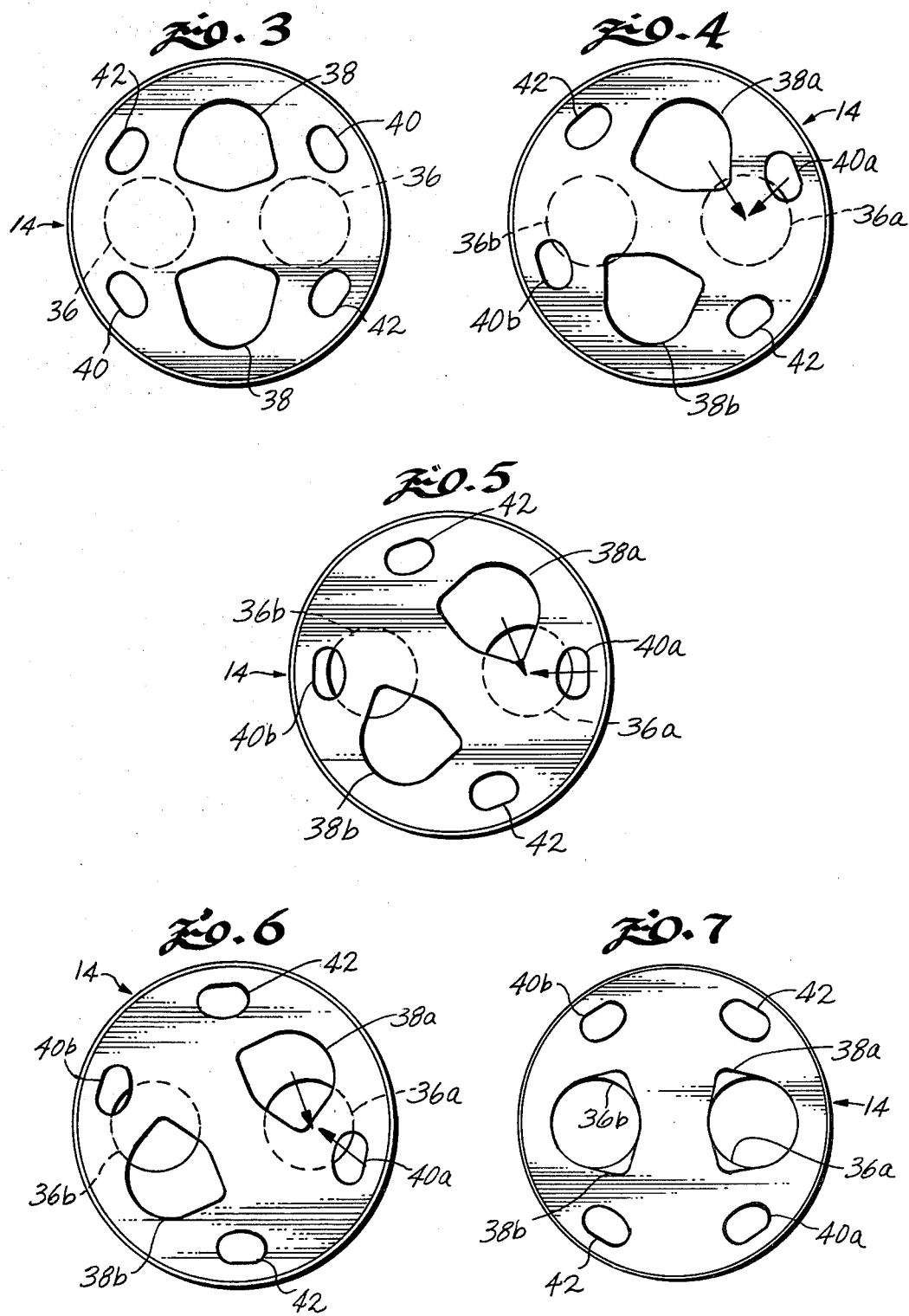

MULTIPLE ORIFICE VALVES

FIELD OF THE INVENTION

The present invention relates to an orifice valve comprising a set of disks used for controlling the amount and direction of flow of various fluids.

BACKGROUND OF THE INVENTION

Orifice valves are useful for control of flow of fluids, such as fluids produced from oil and gas wells and the like. Orifice valves, for example, are used for control of the rate of flow of well production fluids through a flow line. Often, such fluids contain abrasive materials, such as sand particles.

The rate of flow through an orifice valve is in part determined by the number and size of holes in both a stationary disk and a rotatable disk mounted across a fluid path in a valve body. The holes in the rotatable disk are positioned in various degrees of alignment with holes in the stationary disk by angular movement of the rotatable disk. The rotatable disk can be moved from a fully closed position for blocking flow through the valve to a fully open position for providing maximum flow through the valve.

Sometimes orifice valves have a severe erosion problem caused by the passage of abrasive fluids. Erosion results in a high frequency of valve replacement.

A major portion of the erosion of orifice valves is experienced during the time the valve is only partly open. For example, erosion is most significant when the valve is in a range of positions from being "cracked open", i.e., just slightly open, to a position providing about 25% of the maximum flow through the valve.

When the valve is in this range of positions, a relatively high velocity fluid stream can be directed through holes in the disks toward the wall of the valve body. As the high velocity stream impinges on the wall, it causes rapid erosion. Abrasive fluids have been known, for example, to erode completely through the wall of an orifice valve in as little as several hours.

When the degree of erosion is severe, e.g., when the wall of a valve body has a hole formed in it from impingement of a fluid stream, oil well production must be stopped while the valve is replaced. Both the down time caused by valve replacement and the expense of the valves results in a significant increase in the cost of recovery of petroleum products.

Erosion is in part avoided by providing orifice valves made in part of erosion-resistant materials. These materials can be ceramic materials or metals such as tungsten carbide and the like.

However, even when erosion-resistant materials are used, the rate of erosion and resulting frequency of valve replacement is still much higher than desired.

The cost of petroleum products is increasing at a rapid rate. It is, therefore, desirable to provide an orifice flow control valve which requires a minimal frequency of replacement, resulting in less down time of well systems for improving economics of petroleum recovery.

SUMMARY OF THE INVENTION

A set of disks for installation in an orifice flow control valve is provided. A first disk has a center and at least one hole is through the first disk on a radius of the first disk. A second disk has a center and at least one main hole is through the second disk on a first radius of the second disk. Additionally, there is at least one auxiliary hole through the second disk on a second radius of the second disk. The auxiliary hole through the second disk is sufficiently close to the main hole so that at least a portion of both the auxiliary hole and the main hole are simultaneously superimposable over the hole through the first disk when the disks are concentric.

The disks are mounted concentrically in face-to-face engagement in a valve body for providing an orifice flow control valve. The second disk having at least one main hole and one auxiliary hole is mounted upstream of the first disk. The disks define an upstream chamber and a downstream chamber in the valve and are rotatable relative to each other. The plurality of holes in the disks provide at least one generally axially directed stream in the downstream chamber when the valve is fully open and at least two streams which impinge on each other in the downstream chamber when the valve is in a position between fully open and fully closed.

BRIEF DESCRIPTION OF THE DRAWINGS

These and other features, aspects, and advantages of the present invention will become more apparent when considered with respect to the following detailed description, appended claims, and accompanying drawings wherein:

FIG. 3 is a face-on view of a set of disks of an exemplary embodiment at an angular position relative to each other when the valve is closed;

FIG. 4 is a face-on view of the set of disks with the valve cracked open;

FIG. 5 is a face-on view of the set of disks with the valve further open;

FIG. 6 is a face-on view of the set of disks with the valve still further open; and FIG. 7 is a face-on view of the set of disks with the valve completely open.

DETAILED DESCRIPTION

Figure 1:
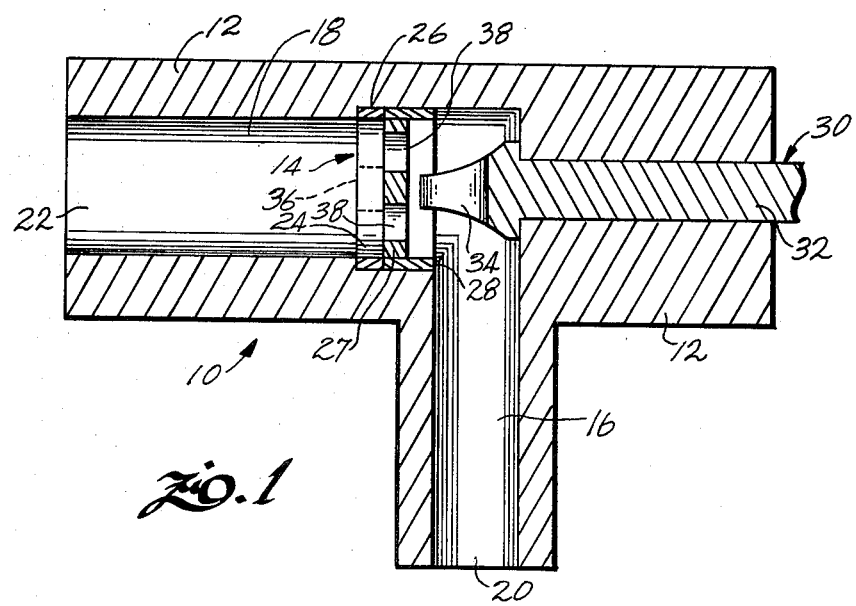
FIG. 1 is a semi-schematic longitudinal cross-sectional view of an orifice valve of an exemplary embodiment of this invention.

Referring to FIG. 1, there is shown a semi-schematic longitudinal cross-sectional view of an exemplary embodiment of an orifice valve 10. The orifice valve comprises a valve body 12 divided by a set of disks 14 into an upstream chamber 16 and a downstream chamber 18.

There is an inlet opening 20 into the upstream chamber for entrance of fluids and an outlet opening 22 from the downstream chamber for fluid egress.

Although not shown in the drawings, suitable means for connecting the valve body to inlet and outlet conduits are provided. These means can include flanges, threads or the like at the inlet and outlet of the valve body.

Minimal details of the valve are included herein since they are conventional and not needed for an understanding of the invention. Additional details of orifice valves can be found in U.S. Pat. No. 3,207,181 and in U.S. Pat. No. 3,331,396 to R. S. Willis, both of which are incorporated herein by this reference.

The set of disks 14 comprises a downstream disk 24 and an upstream disk 27 which are preferably composed of erosion resistant materials. The erosion resistant materials can be ceramics such as aluminum oxide or the like or materials such as tungsten carbide. It is preferred that the material used for forming such disks have a hardness greater than about 8 on the Mohs scale.

At least one hole is through each disk on a radius of the disk. When holes through the disks do not overlap to any degree, i.e., when the holes are completely out of alignment with each other, fluid flow from the upstream chamber to the downstream chamber is blocked. When holes through the disks are at least partly in alignment with each other, i.e., when portions of the holes are superimposed, fluid introduced into the upstream chamber through the inlet 20 can flow through holes in the disks into the downstream chamber and exit the valve at the outlet 22. The amount of fluid flow through the valve is controlled by the degree of alignment of the holes.

In an exemplary embodiment, the downstream disk 24 is mounted in a fixed position in the valve body across the fluid flow path between the upstream and downstream chambers in the valve body. The downstream disk is mounted in an annular ring 26 which surrounds the circumference of the disk and is affixed to the disk by bonding with epoxy resin or other like adhesive materials and/or by other securing means such as pins. The ring, in turn, is fixed by bolts, pins or the like to the valve body.

The upstream disk is rotatably mounted in the valve body and is concentric and in face-to-face engagement with the downstream disk. Each of the disks of the exemplary embodiment has about equal radial and axial dimensions, although disks of differing dimensions can be used if desired.

The upstream disk 27 is mounted in an annular ring 28 which surrounds the circumference of the disk. The upstream disk can be rotated relative to the downstream disk for superimposing holes in the upstream disk in various degrees of overlap or alignment with holes in the downstream disk. The disks are flat and the facing surfaces are smooth to provide ease of movement of the disks relative to each other and a seal when the valve is closed. In an exemplary embodiment, the facing surface of each disk has an 8 microinch RMS finish.

To effect angular or rotational movement of the upstream disk, an operator member 30 is mounted in the valve body. The operator 30 comprises a valve stem 32 passing through an opening at one end of the valve body. The valve stem is sealed to prevent passage of fluids between the stem and the valve body of O-rings or the like (not shown). The valve stem provides a means for rotating the annular ring 28. For example, a forked turning member is provided on the end of the valve stem. The forked member has tines 34 which engage slots (not separately shown) in the annular ring 28 holding the upstream disk. When the valve stem is rotated, the tines engaged in the slots cause rotation of the ring which, in turn, provides rotation of the upstream disk.

Graduated markings can be provided on the valve body to indicate the position of the valve as the disk is rotated from its fully closed to a fully open position.

Figure 2:
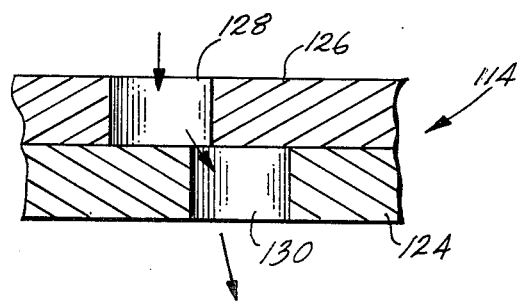
FIG. 2 is a fragmentary semi-schematic cross-sectional view of a set of disks in face-to-face engagement.

As described above, there is a major valve erosion problem when holes in an upstream and downstream disk are not fully in alignment and erosive materials are present. This can be more readily understood by referring to FIG. 2, which is a fragmentary semi-schematic cross-sectional view of a set of disks 114 which are contiguous and in face-to-face engagement. The set of disks 114 comprises an upstream disk 126 having a hole 128 which is in part superimposed, i.e., in some measure of alignment less than fully aligned, over a hole 130 in the downstream disk 124.

As fluids pass through the hole 128 in the upstream disk into the hole 130 in the downstream disk, it can be seen that there is a resultant non-axial force on the fluid stream which can direct the stream exiting the hole with at least some radial component of motion. Impingement of a radially directed stream on the wall of a valve body can result in erosion, described above.

In the exemplary embodiment, there are at least two holes through the upstream disk 27 and at least one hole through the downstream disk 24 for providing at least two streams which impinge on each other in the downstream chamber when the valve is in a position between fully open and fully closed. For example, a first stream can have a component directed toward the wall of the valve body and another stream which impinges on the first stream can be directed toward the axis of the valve for deflecting the first stream. The impinging streams form a resultant stream which flows generally parallel to the axis of the downstream chamber. This minimizes impingement of fluid streams on the wall of the valve body, thereby significantly decreasing the rate of erosion in such a valve.

Additionally, the holes provide at least one generally axially directed stream in the downstream chamber 18 when the valve is in a fully open position.

It has been found that the erosion of a valve can be high when the valve is in less than a fully open position, especially when the valve is in a position between cracked slightly open and about 25% open. It is preferred that streams through holes in the disks are provided which impinge on each other when the valve is in this range of positions. Beyond about 25% open, the stream through a valve is near enough axial that erosion is seldom a severe problem.

If desired, more than one pair of impinging streams can be provided by providing additional holes in the disks. For instance, two pairs of impinging streams can be provided with each pair of streams forming a resultant stream flowing generally parallel to the axis of the downstream chamber. Such an arrangement is desirable since the total flow through the valve can be greater when the valve is fully open, permitting use of a small size valve.

This invention can be more fully understood by referring to FIGS. 3 through 7 which show the set of disks 14 of the exemplary embodiment. The disks are shown in a "face-on view", i.e., they are shown as viewed from the upstream chamber 16 toward the downstream chamber 18. For clarity of illustration, the valve body is not shown.

The disks 14 are contiguous and mounted coaxially in face-to-face engagement. A plurality of holes in both disks are shown in various alignments relative to each other in the figures. Holes in the upstream disk 26 are in solid lines and holes in the downstream disk 24 are in dashed lines when occulted by parts of the upstream disk.

Two diametrically opposed circular downstream holes 36 are through the first or downstream disk 24, with each hole on a radius of such a downstream disk. The downstream holes are parallel to the axis of the disk.

Two diametrically opposed main or upstream holes 38 are through the second or upstream disk with each main hole on a first radius of the upstream disk. The main holes are parallel to the axis of the disk. Each of the main holes has about an equal area to the area of each of the holes 36 in the downstream disk. The main holes are nearly round with a portion of each main hole adjacent its radially innermost edge extending circumferentially beyond a circular cross-section.

First and second pairs of auxiliary holes 40 and 42 are through the upstream disk with each auxiliary hole on a second radius of the upstream disk. The auxiliary holes are parallel to the axis of the disk. The auxiliary holes of each pair of diametrically opposed and the area of each auxiliary hole is less than the area of each main hole. Each auxiliary hole has a circumferential extent greater than its radial extent. Only one pair of such auxiliary holes need be considered for an understanding of this invention.

Adjacent main and auxiliary holes are sufficiently close to each other so that at least portions of such an adjacent main and auxiliary hole are simultaneously superimposable over the hole 36 in the first disk.

Referring now to FIG. 3, the disks are shown in the "valve closed" positioned; that is, the holes in the upstream disk 27 are out of alignment with holes in the downstream disk 24. In this position, the main holes 38 and auxiliary holes 40 are occulted simultaneously by portions of the downstream disk.

Referring to FIG. 4, the upstream disk is shown after having been rotated slightly in the clockwise direction. Both of the main holes 38 and each of the auxiliary holes 40 are partly superimposed over the downstream holes 36. This position can be considered a "cracked open" position because only a small portion of the hole in the downstream disk is in alignment with holes in the upstream disk.

When fluids are introduced into the upstream chamber of the valve, two pairs of impinging fluid streams are formed in the downstream chamber. One pair is formed by the main hole 38a, auxiliary hole 40a, and hole 36a in the downstream disk. The other pair is formed by the main hole 38b, auxiliary hole 40b, and the hole 36b in the downstream disk. Since, in this embodiment, each of the pairs of impinging fluid streams is similar, only one pair will be discussed.

Fluid which passes from the upstream chamber as a first fluid stream through the main hole 38a and thence through the hole 36a in the downstream disk has tangential, radial, and axial components. The radial component of the first stream is positive, i.e., it is directed away from the axis of the valve and toward the wall of the valve body. The stream is shown by the arrow passing through the main hole 38a and the hole 36a in the downstream disk.

A second fluid flow stream passing from the upstream chamber through the auxiliary hole 40a and thence through the hole 36a in the downstream disk also has tangential, radial, and axial components, with the radial component being negative, i.e., the radial component is directed toward the axis of the valve and away from the wall of the valve body. This stream is shown by the arrow passing through the auxiliary hole 40a and the hole 36a in the downstream disk. The flow streams having such positive and negative radial components are directed on paths which intersect; that is, the flow streams impinge on each other to form a resultant stream which flows more or less parallel to the axis of the valve.

It is desired that the positive radial component of the first stream is not substantially greater than the negative radial component of the second stream. This is provided by positioning the auxiliary and main holes so that the auxiliary and main holes are superimposed to about the same extent over the hole in the downstream disk when the valve is between fully closed and about one-quarter open; that is, the areas of the main and auxiliary holes superimposed over the downstream hole are about equal. Therefore, the fluid streams flowing through the main hole and auxiliary hole are about equal when the valve is in this range of positions.

When radial components of both streams are about equal, a resultant stream is formed which flows generally parallel to the axis of the valve body. If, however, the positive radial component of the first stream were appreciably greater than the negative radial component of the second stream, the resultant stream can be directed in some measure toward the wall of the valve body, thereby impinging on the wall and causing erosion.

Having streams that impinge for forming a resultant stream parallel to the axis of the valve body minimizes damage that can be caused by flow streams impinging on the wall of a valve body.

It can be seen that when there are two pairs of auxiliary holes as in the exemplary embodiment, the upstream disk can be rotated either in the clockwise or in the counterclockwise direction from its fully closed to its fully open position. This increases the life of the valve by providing different portions of the main and auxiliary holes being subjected to the high velocity stream of abrasive fluids. Additionally, resultant streams are formed in different portions of the valve body downstream of the disks and, therefore, can cause less wear on different portions of both the disk and the valve body itself.

The sequence of superimposing the main and auxiliary holes over the hole in the downstream disk can be significant. For example, it is desired that the main hole is not superimposed over the hole in the downstream disk before any portion of the auxiliary hole is positioned over the hole in the downstream disk. If the main hole were superimposed first, a single stream through the main hole and hole in the downstream disk would be formed which would be directed against the wall of the valve body, causing erosion.

In order to provide a flow stream directed toward the axis of the valve, a portion of the auxiliary hole 40a furthest from the center of the upstream disk is more remote from the center of the upstream disk than any portion of the downstream hole 36a is remote from the center of the downstream disk. Additionally, a portion of the auxiliary hole nearest the center of the upstream disk is less remote from the center of the upstream disk than the outermost portion of the hole through the downstream disk is remote from its center. Once again, this is desired to provide a flow stream through the upstream disk and thence through the hole in the downstream disk which is directed toward the axis of the valve.

When rotating the upstream disk in the clockwise direction as shown, the area of such an auxiliary hole 40a superimposed over the downstream hole 36a initially increases as the disk is rotated from the closed position towards an open position. Also, the rate of increase of overlap of the upstream or main hole is about the same as the rate of increase of overlap of the auxiliary hole as the disk is rotated from its closed position to an intermediate position between the closed and the fully open position.

Referring now to FIG. 5, the upstream disk is at a position where the area of the auxiliary hole superimposed over the hole in the downstream disk is at about its maximum. The flow stream through the main hole 38a and downstream hole 36a has a radial component and is directed toward the wall of the valve body. The flow stream through the auxiliary hole 40a and downstream hole 36a has a radial component and is directed toward the axis of the valve. These streams impinge to form a resultant stream directed generally parallel to the axis. Upon continued movement of the upstream disk in a clockwise direction, the area provided for flow through the auxiliary hole decreases and the area provided for flow through the main hole increases.

It is preferred that holes in the disks are positioned and of such dimension for providing a continuous increase in the total flow rate of fluid through the valve as the upstream disk is rotated relative to the downstream disk from its fully closed to its fully open position.

Referring to FIG. 6, it can be seen that the rate of decrease of the area of the auxiliary hole 40a superimposed over the hole 36a is less than the rate of increase of the area of the main hole 38a superimposed over the hole 36a. This provides for the continued increase in the flow rate through the valve as the upstream disk is rotated clockwise from the position of maximum flow through the auxiliary hole. That is, the flow rate through the valve increases even as the flow rate through the auxiliary hole decreases.

Now turning to FIG. 7, the upstream disk has been rotated about 90° from its initial position as shown in FIG. 3 and is in a "fully open" position. There are two flow streams flowing through the valve in its fully open position. One flow stream is through each of the main holes and each of the holes 30 in the downstream disk. Each of the auxiliary holes is occulted by portions of the downstream disk. Therefore, the auxiliary holes are closed both in the valve open and valve closed position. They are open only in some intermediate positions.

By providing holes as shown, it can be seen that during the valve's full range of travel from a fully closed to a fully open position, fluid will not be directed with substantial force against the wall of the valve body to cause erosion. The flow stream that is directed toward the valve body impinges a flow stream directed toward the axis of the valve for providing the resultant flow stream flowing generally parallel to the axis. This significantly increases the life of the valve and improves economics of petroleum production.

The above description of an orifice valve, including disks seated in the valve body, is for illustrative purposes. Because of variations which will be apparent to those skilled in the art, the present invention is not intended to be limited to the particular embodiments described above. Thus, for example, an auxiliary hole can be connected to a main hole in the upstream disk to form a single hole functioning as described herein. For such reasons, the scope of the invention is defined in the following claims.

What is claimed is:

1. An orifice flow control valve having an open position and a closed position comprising:

a valve body;

a downstream disk fixed in the valve body;

an upstream disk concentric and in face-to-face engagement with the downstream disk;

an upstream chamber in the valve body upstream from the upstream disk;

a downstream chamber in the valve body downstream from the downstream disk;

a pair of downstream fluid flow holes through the downstream disk in communication with the downstream chamber;

a pair of upstream fluid flow holes through the upstream disk in communication with the upstream chamber;

means for rotating the upstream disk relative to the downstream disk between a closed position with the upstream holes out of alignment with the downstream holes and an open position with the upstream holes in alignment with the downstream holes; and at least a pair of auxiliary holes through the upstream disk in communication with the upstream chamber, a portion of each such auxiliary holes overlapping a portion of each such downstream hole in a range of positions between the open position and the closed position so that the auxiliary holes are closed in both the valve open and valve closed positions and are at least partly open at an intermediate position between the valve open and valve closed positions.

2. An orifice flow control valve according to claim 1 wherein the area of such an auxiliary hole overlapping such a downstream hole initially increases as the upstream disk is rotated from the closed position towards the open position and thereafter decreases.

3. An orifice flow control valve according to claim 2 wherein the area of such an upstream fluid flow hole overlapping the downstream hole continuously increases as the upstream disk is rotated from the closed position towards the open position.

4. An orifice flow control valve according to claim 2 wherein the rate of increase of area of overlap of the upstream hole is greater than the rate of decrease of area of overlap of the auxiliary hole as the upstream disk is rotated from the closed position toward the open position.

5. An orifice flow control valve according to claim 1 wherein the rate of increase of area of overlap of the upstream hole is about the same as the rate of increase of area of overlap of the auxiliary hole as the upstream disk is rotated from the closed position towards an intermediate position between the closed position and the open position.

6. An orifice flow control valve according to claim 1 wherein the area of each upstream hole is about the same as the area of a downstream hole and the area of each auxiliary hole is appreciably less than the area of a downstream hole.

7. An orifice flow control valve according to claim 1 wherein a portion of such an auxiliary hole is more remote from the center of the upstream disk than any portion of such a hole in the downstream disk is remote from the center of the downstream disk.

8. An orifice flow control valve according to claim 1 wherein such a downstream hole is round, such an upstream hole is nearly round, and such an auxiliary hole has a greater circumferential extent than its radial extent.

9. An orifice flow control valve according to claim 1 wherein such a downstream hole has a generally circular cross section and such an upstream hole has a generally circular cross section with a portion adjacent its radially innermost edge extending circumferentially beyond a circular cross section.

10. An orifice flow control valve according to claim 1 wherein the downstream hole is simultaneously superimposable over a portion of the upstream hole and a portion of the auxiliary hole, said portion of the auxiliary hole being further from the center of the upstream disk than said portion of the upstream hole.

11. An orifice flow control valve comprising:
(a) a valve body;
(b) a set of disks comprising:
   (i) a downstream disk fixedly mounted in the valve body, the downstream disk having a center, two diametrically opposed holes through the downstream disk on a diameter of the downstream disk, the diametrically opposed holes having about equal dimensions with the center of each such hole being about the same distance from the center of the downstream disk; and
   (ii) an upstream disk rotatably mounted in the valve body in face-to-face engagement with the downstream disk and concentric with the downstream disk, the upstream disk having two diametrically opposed main holes on a first diameter of the upstream disk and at least one pair of diametrically opposed auxiliary holes on a second diameter of the upstream disk, the main holes having about equal dimensions with the center of each main hole being about the same distance from the center of the upstream disk, such auxiliary holes having about equal dimensions and having a cross-sectional area less than the cross-sectional area of the main holes, the center of each auxiliary hole being about the same distance from the center of the disk and being more remote from the center of the disk than the center of such a main hole, and wherein the locus of the holes in the upstream and downstream disks is such that when the upstream disk is in an intermediate position between a closed position and an open position, fluid flows through such a main hole and such a hole in the downstream disk in a first stream having a component directed away from the axis of the valve, and fluid passes through such an auxiliary hole and through the same hole in the downstream disk in a second stream having a component directed toward the axis of the valve, the first and second streams converging downstream from the downstream disk.

12. An orifice flow control valve according to claim 11 wherein the area of such a main hole is about equal to the area of such a downstream hole and the area of such an auxiliary hole is less than the area of such a main hole.

13. An orifice flow control valve according to claim 11 wherein the open area of such an auxiliary hole equal to the open area of such a main hole at such an intermediate position between a closed position and an open position.

14. In an orifice flow control valve comprising a valve body having an inlet and an outlet and a passage therethrough, a set of disks mounted in the valve body across the passage, the set comprising a downstream disk fixedly mounted in the valve body and an upstream disk rotatably mounted in the valve body concentric and in face-to-face engagement with the downstream disk, means extending into the valve body for rotating the upstream disk, the downstream disk having at least one hole through the disk on a radius of the disk and the upstream disk having at least one main hole through the disk on a radius of the disk, the holes being movable into and out of alignment for control of flow of fluid through the valve upon rotation of the upstream disk, the improvement comprising:
at least one auxiliary hole through the upstream disk on a radius of the upstream disk, the portion of such an auxiliary hole furthest from the center of the upstream disk being a greater distance from the center of the upstream disk than any portion of the downstream hole is from the center of the downstream disk and a portion of the auxiliary hole a smaller distance from the center of the upstream disk than the outermost portion of the hole through the downstream disk is from the center of the downstream disk.

15. In an orifice flow control valve comprising a valve body having a set of contiguous disks mounted coaxially therein, the disks defining an upstream chamber in said valve body upstream of an upstream disk for delivering fluid to the upstream disk, and a downstream chamber in said valve body downstream of the downstream disk for receiving fluid from the downstream disk, the disks being rotatable relative to each other, the improvement comprising:
each of the disks having a plurality of holes therethrough for providing only two generally axially directed streams in the downstream chamber when the valve is fully open and two main streams and two auxiliary streams in the downstream chamber when the valve is in a position between fully open and fully closed, each of said auxiliary streams impinging on a main stream for deflecting such main stream.

16. A set of disks for installation in an orifice flow control valve comprising:
a first disk having a center and a pair of holes through the first disk on a diameter of the first disk; and
a second disk having a center, a pair of main holes through the second disk on a first diameter of the second disk, a pair of auxiliary holes on a second diameter of the second disk, such main holes being superimposable over the holes in the first disk when the disks are concentric for control of flow through such a valve, the portion of such an auxiliary hole nearest the center of the second disk being more remote from the center of the second disk than a portion of such a main hole nearest the center of the second disk, and less remote from the center of the second disk than the outermost portion of such a hole through the first disk is from the center of the first disk, and wherein a portion of such an axuiliary hole is more remote from the center of the second disk than any portion of such a hole in the first disk is from the center of the first disk, the first and second diameters on the second disk being located so that with the first and second disks concentric in one orientation only the main holes in the first and second disks are superimposable and in another orientation a portion of the main holes in the second disk and a portion of the auxiliary holes in the second disk are superimposable over the main holes in the first disk, and in a third orientation none of the holes are superimposable.

17. A set of disks according to claim 16 wherein the first and second disks comprise a material selected from the group consisting of tungsten and aluminum oxide.

18. A set of disks according to claim 16 wherein the first and second disks comprise a material having hardness greater than about 8 on the Mohs scale.

19. A set of disks for installation in an orifice flow control valve comprising:
a first disk having a center and at least one hole through the first disk on a radius of the first disk; and
a second disk having a center, at least one main hole through the second disk on a first radius of the second disk and at least one auxiliary hole through the second disk on a second radius of the second disk, such a main hole and auxiliary hole being superimposable over such a hole in the first disk when the disks are concentric in a first orientation for control of flow through such a valve, a portion of the area of the auxiliary hole being farther radially from the center of the disk than any portion of the area of the hole through the first disk, such a main hole being superimposable and auxiliary hole being not superimposable over such a hole in the first disk when the disks are concentric in a second orientation and none of the holes in the second disk being superimposable over holes in the first disk when the disks are concentric in a third orientation.

20. A set of disks for installation in an orifice flow control valve comprising:
a first disk having a center and at least one round hole through the first disk on a radius of the first disk; and
a second disk having a center, at least one nearly round main hole through the second disk on a first radius of the second disk, and at least one auxiliary hole through the second disk on a second radius of the second disk, such a main hole and auxiliary hole being superimposable over such a hole in the first disk when the disks are concentric for control of flow through such a valve, the area of the main hole through the second disk being about the same as the area of the hole through the first disk and the area of the auxiliary hole through the second disk being smaller than the area of the main hole, and the auxiliary hole having a greater circumferential extent than its radial extent.

21. A set of disks according to claim 20 wherein the main hole through the second disk has a portion adjacent its radially innermost edge, extending circumferentially beyond a circular cross-section.

22. A set of disks for installation in an orifice flow control valve comprising:
a first disk having a center, and two diametrically opposed circular holes having equal radii through the first disk on a diameter of the first disk; and
a second disk having about the same diameter as the first disk, a center, two diametrically opposed main holes through the second disk on a first diameter of the second disk, and at least two diametrically opposed auxiliary holes through the second disk on a second diameter of the second disk, the areas of the main holes being about equal and the areas of the auxiliary holes being about equal, the area of such an auxiliary hole being less than the area of such a main hole, such a main hole being sufficiently close to such an auxiliary hole so that at least a portion of such auxiliary hole and such main hole are simultaneously superimposable over such a hole in the first disk when the disks are concentric, a portion of such an auxiliary hole being more remote from the center of the second disk than any portion of such a hole in the first disk is remote from the center of the first disk, such a main hole being nearly round, there being a portion of the main hole adjacent its radially innermost edge extending circumferentially beyond its circular cross-section, such an auxiliary hole having a greater circumferential extent than its radial extent, the portion of such an auxiliary hole nearest the center of the second disk being more remote from the center of the second disk than the portion of such a main hole nearest the center of the second disk, and less remote from the center of the second disk than the outermost portion of such a hole through the first disk is from the center of the first disk.

23. An orifice flow control valve comprising:
a valve body;
a set of disks comprising:
a first disk fixedly mounted in the valve body, the first disk having a center and two diametrically opposed circular holes having equal radii through the first disk on a diameter of the first disk; and
a second disk rotatably mounted in the valve body in face-to-face engagement with the first disk and concentric with the first disk, the second disk having about the same diameter as the first disk, a center, two diametrically opposed main holes through the second disk on a first diameter of the second disk, and at least two diametrically opposed auxiliary holes through the second disk on a second diameter of the second disk, the areas of the main holes being about equal and the areas of the auxiliary holes being about equal, the area of such an auxiliary hole being less than the area of such a main hole, such a main hole being sufficiently close to such an auxiliary hole so that at least a portion of such auxiliary hole and such main hole are simultaneously superimposable over such a hole in the first disk, a portion of such an auxiliary hole being mre remote from the center of the second disk than any portion of such a hole in the first disk is remote from the center of the first disk, such a main hole being nearly round, there being a portion of the main hole adjacent its radially innermost edge extending circumferentially beyond its circular cross-section, such an auxiliary hole having a greater circumferential extent than its radial extent, the portion of such an auxiliary hole nearest the center of the second disk being more remote from the center of the second disk than the portion of such a main hole nearest the center of the second disk, and less remote from the center of the second disk than the outermost portion of such a hole through the first disk is from the center of the first disk.

24. A set of disks for face-to-face installation in an orifice flow control valve comprising:
a first disk having a pair of diametrically opposed holes through the disk on a diameter of the first disk; and
a second disk having a pair of diametrically opposed main holes through the disk on a first diameter of the second disk, the main holes being at about the same radial distance from the center of the second disk as the radial distance of the holes in the first disk are from the center of the first disk, and a pair of diametrically opposed auxiliary holes through the second disk on a second diameter of the second disk, the auxiliary holes being at a greater radial distance from the center of the second disk than the radial distance of the main holes from the center of the second disk;

the holes through the second disk being arranged so that when the disks are superimposed in concentric face-to-face relation the disks can be placed in at least each of the following positions:
(a) all of the holes through the second disk are occulted by the first disk,
(b) the main holes through the second disk are aligned with the holes through the first disk and the auxiliary holes through the second disk are occulted by the first disk, and
(c) each of the main holes through the second disk partly overlaps one of the holes through the first disk and is partly occulted by the first disk and each of the auxiliary holes through the second disk partly overlaps one of the holes through the first disk and is partly occulted by the first disk.

25. A set of disks according to claim 24 wherein at least a portion of each auxiliary hole through the second disk occulted by the first disk in position (c) is radially further from the center of the second disk than the corresponding hole in the first disk is from the center of the first disk.

26. A set of disks according to claim 24 wherein the second disk further comprises a second pair of diametrically opposed auxiliary holes through the second disk on a third diameter of the second disk, the second and third diameters being symetrically on opposite sides of the first diameter.

27. A set of disks according to claim 24 wherein the main holes in the second disk have about the same areas as the holes through the first disk and the auxiliary holes through the second disk have areas smaller than the areas of the holes through the first disk.

* * * * *

UNITED STATES PATENT AND TRADEMARK OFFICE
CERTIFICATE OF CORRECTION

PATENT NO. : 4,360,040
DATED : November 23, 1982
INVENTOR(S) : Harry R. Cove, John D. Muchow It is certified that error appears in the above-identified patent and that said Letters Patent are hereby corrected as shown below:

Column 3, Line 47, "of" should be -- by --.
Column 5, Line 10, "of" (first occurrence) should be -- are --.
Column 5, Line 21, "positioned" should be -- position --.
Column 9, Line 54, -- is about -- should be inserted after "hole" and before "equal".
Column 10, Line 68, -- carbide -- should be inserted after "tungsten" and before "and".
Column 12, Line 41, "mre" should be -- more --.

Signed and Sealed this

Twenty-second Day of March 1983

[SEAL]

Attest:

GERALD J. MOSSINGHOFF

Attesting Officer    Commissioner of Patents and Trademarks